US010197363B1

(12) United States Patent
Gamache et al.

(10) Patent No.: US 10,197,363 B1
(45) Date of Patent: Feb. 5, 2019

(54) POROUS REFRACTORY ARMOR SUBSTRATE

(71) Applicant: The United States of America, as represented by the Secretary of the Navy, Washington, DC (US)

(72) Inventors: Raymond M Gamache, Indian Head, MD (US); Charles M Roland, Waldorf, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/477,950

(22) Filed: Apr. 3, 2017

(51) Int. Cl.
*F41H 5/04* (2006.01)
*B32B 9/04* (2006.01)
*B32B 7/12* (2006.01)

(52) U.S. Cl.
CPC .......... *F41H 5/0414* (2013.01); *B32B 7/12* (2013.01); *B32B 9/04* (2013.01); *F41H 5/0421* (2013.01); *F41H 5/0428* (2013.01); *F41H 5/0492* (2013.01); *B32B 2571/02* (2013.01)

(58) Field of Classification Search
CPC .... F41H 5/0414; F41H 5/0421; F41H 5/0428; F41H 5/0492; B32B 7/12; B32B 9/04; B32B 2571/02
USPC ...................................................... 89/36.02
See application file for complete search history.

(56) References Cited

U.S. PATENT DOCUMENTS

| 3,771,418 | A | 11/1973 | Gulbierz et al. |
| 3,793,648 | A * | 2/1974 | Dorre ............... F41H 5/0492 2/2.5 |
| 5,654,518 | A * | 8/1997 | Dobbs ................. B64D 7/00 109/49.5 |
| 5,814,250 | A * | 9/1998 | Dudt ................... E04H 9/04 264/241 |
| 7,520,223 | B2 * | 4/2009 | Sharpe ............... F42D 5/045 102/303 |
| 7,540,228 | B1 | 6/2009 | Cronin et al. |
| 7,980,165 | B2 * | 7/2011 | Misencik ............. E04H 9/10 89/36.02 |
| 8,580,387 | B1 | 11/2013 | Fedderly et al. |
| 8,746,122 | B1 | 6/2014 | Roland et al. |
| 8,815,408 | B1 | 8/2014 | Cochran et al. |
| 9,207,048 | B1 * | 12/2015 | Roland ................ F41H 5/007 |
| 9,314,996 | B1 | 4/2016 | Wedding et al. |

(Continued)

OTHER PUBLICATIONS

Deep Springs Technology, "Armor Applications" (http://www.teamdst.com/LSAM.htm, accessed on Dec. 29, 2016).

(Continued)

*Primary Examiner* — Samir Abdosh
(74) *Attorney, Agent, or Firm* — U.S. Naval Research Laboratory; Sean M. Walsh

(57) ABSTRACT

Composite armor and armor systems according to the invention incorporate substrates that delay and reduce compressive waves associated with impacts from reflecting off of the back surface of ceramic front face armor as tensile waves, which may damage or destroy the front face armor material. The composite armor and armor systems incorporating syntactic substrates and backed by a high strength fiber backing exhibit increased mass efficiency and reduced blunt force trauma resulting from ballistic impacts.

17 Claims, 4 Drawing Sheets

(56) References Cited

U.S. PATENT DOCUMENTS

| | | | |
|---|---|---|---|
| 2003/0167910 A1* | 9/2003 | Strait | F41H 5/0414 89/36.02 |
| 2009/0090236 A1* | 4/2009 | Misencik | E04H 9/10 89/36.02 |
| 2009/0269552 A1* | 10/2009 | Foldager | F41H 5/013 428/172 |
| 2012/0196147 A1* | 8/2012 | Rabiei | B22F 3/1112 428/613 |
| 2012/0264342 A1* | 10/2012 | Boogh | C08L 23/0876 442/135 |
| 2012/0312150 A1 | 12/2012 | Gamache et al. | |
| 2014/0305294 A1* | 10/2014 | Micarelli | F41H 5/0442 89/36.02 |
| 2015/0377592 A1 | 12/2015 | Roland et al. | |
| 2016/0380345 A1* | 12/2016 | Kolak | H01Q 1/422 343/872 |

OTHER PUBLICATIONS

"Armor Applications," Deep Springs Technology website, http://www.teamdst.com/LSAM.htm (accessed Feb. 1, 2017).

"Ballistic Body Armor Insert Composition and Defeat Mechanisms," Testing of Body Armor Materials: Phase III, Appendix E, The National Acadamies Press (2012).

W.H. Gust and E.B. Royce, "Dynamic Yield Strengths of Light Armor Materials," UCRL-50901, Lawrence Radiation Laboratory, pp. 1-22 (1970).

T. Rahimzadeh, et al., "Design of Armor for Protection against Blast and Impact," J. Mech. Phys. Solids, 85:98-111 (2015).

\* cited by examiner

POROUS REFRACTORY ARMOR SUBSTRATE

TECHNICAL FIELD

This application relates generally to composite armor and armor systems incorporating substrates that both extend the dwell time and reduce rarefaction wave amplitudes associated with impacts reflecting off of ceramic armor materials as tensile waves, causing failure of the ceramic material. The composite armor system incorporates both ceramic armor material and backing substrates, including a spall liner, that exhibit increased mass efficiency and reduce blunt force trauma resulting from ballistic impacts.

BACKGROUND OF THE INVENTION

Effective armor technologies have been sought for many decades to protect humans, vehicles, and equipment against threats including projectiles, fragmentation, and blast damage.

Current body armor typically incorporates ceramic plates (Small Arms Protective Inserts/Enhanced Small Arms Protective Inserts, i.e., SAPI/ESAPI) backed by ultra-high-molecular-weight polyethylene (UHMWPE). These plates are effective against threats up to .30 caliber M2AP bullets. Currently, SAPI/ESAPI plates are considered to be one of the highest mass efficiency armor systems available through a synergistic interaction between the front ceramic plate and textile backing fabric.

Ceramics applied to armor designs perform well in defeating sharp, hardened ogives due to their high hardness and compressive strength. Limitations to ceramics include both lower tensile strength (i.e., on the order of $\frac{1}{10}$ of their compression strength) and high shock velocities (i.e., greater than 15,000 fps). Typically, the compressive wave generated from a ballistic impact travels at a much faster velocity than the incident impact velocity. Due to the higher velocity, the compressive wave can reflect from the back surface of the ceramic forming a tensile wave. In addition to the back surface reflection, additional reflections occur within the formed impact crater. When two reflected rarefaction waves combine and exceed the tensile strength of the material, spall will occur. The spall will typically cause breakup of the ceramic well before the time it would take for the projectile to penetrate through the ceramic. Due to the short time duration required, only a fraction of the ceramic has been penetrated by the projectile by the time spall occurs. For this reason, ceramic armor typically is provided with a backing comprising an ultra-high-molecular-weight polyethylene (UHMWPE) material layer and/or is wrapped in a ballistic-rated body armor fabric. Such fabrics may include fibers comprising fiberglass, carbon fiber, aramid fiber, nylon, polyolefin, polyester, and UHMWPE. The backing material is able to arrest the incident projectile after penetrating the front ceramic plate. Typically, the longer than the ceramic can remain as a solid, the greater the performance of the ceramic to slow down or arrest the projectile. The increased performance of the ceramic reduces both the amount of backing material required and the blunt force trauma from a ballistic impact.

Excessive weight of armor used in personnel protective equipment is linked to fatigue and decreased mobility in personnel over the short term, and chronic injuries and degenerative conditions over the long term. These issues can also lead to lack of compliance with recommended armor use in personnel, increasing the risk of serious injury in the event of an impact. Excessive armor weight also results in premature failure of vehicles and equipment due to increased wear-and-tear.

In the search for a solution to these problems, and in particular the problem of excessive weight in armor used in personnel protective equipment, various approaches have been taken to improve existing armor.

U.S. Pat. No. 3,771,418 describes an anti-spall lightweight armor for military vehicles that includes a shock-absorbent layered combination of materials comprising an outer layer having a tensile strength of between $10^4$ and $10^6$ pounds per square inch, and an elastic modulus of between $10^5$ and $10^8$ pounds per square inch, and a deformable inner layer rigidly adhered to said outer layer, wherein the material constituting the outer layer possesses both a higher tensile strength and a higher elastic modulus than the material constituting the inner layer. The inner layer spreads a shock wave resulting from an impact over a spherical area that is at least 100 times greater in size than the spherical area that the outer layer presents to the wave front.

U.S. Pat. No. 7,540,228 describes an armor for protection against large caliber projectiles that has a ceramic layer with a confinement layer on a front thereof. The ceramic layer is backed by a first metallic layer and the first metallic layer in turn is backed by a composite layer. The composite layer is backed by a second metallic layer, which in turn is backed by an anti-trauma layer. The armor is used to protect personnel, but it can also be used to protect objectives such as vehicles.

U.S. Pat. No. 8,580,387 describes a composite armor including a ballistic armor layer and a directly attached polyurea layer. The polyurea layer is the cured reaction product of an isocyanate curing agent and a mixture of diamines. In a preferred embodiment, the polyurea layer is the strike face. The composite armor is useful for light armor applications in which weight is a factor, such as military vehicle armor and military boat armor.

U.S. Pat. Nos. 8,746,122 and 9,207,048 describe armor systems with a composite laminate having at least four alternating layers (two bi-layers) of a first material and a second material, the first material having a lower acoustic impedance than the second material. The first material is a viscoelastic polymer with a glass transition temperature less than the expected operational temperature range, and the second material can be a hard material such as steel, aluminum, or ceramic. The laminate can include many alternating layers of elastomer and hard material, and can be adhered or affixed to a thicker armor substrate. The second material layer can be a layer of hollow or solid spheres. Additional protective elements such as corrugated metal-ceramic panels and armored glass cylinders can be added to improve resistance to armor piercing rounds, explosively formed penetrators, or other threats.

U.S. Patent Appl. Publ. No. 2012/0312150 describes a body armor composite material provided to protect a wearer from small-arms projectiles. The material includes a flexible liner, a polymer binder disposed on the liner, and ceramic solids embedded in the binder. The flexible liner conforms to a portion of the wearer and elastically deforms in response to application of mechanical force. The binder can be a polyurea foam. The solids can be spheres arranged in a single-layer pattern substantially parallel to liner.

U.S. Patent Appl. Publ. No. 2015/0377592 describes a lightweight armor system providing blast protection and ballistic protection against small arms fire, suitable for use in helmets, personnel or vehicle protection, and other armor systems. A hard substrate is coated on the front surface with a thin elastomeric polymer layer, in which hollow ceramic or metal spheres are encapsulated. The coating layer having a thin elastomeric polymer layer with encapsulated metal or ceramic hollow spheres can be stand-alone blast protection, or can be added to an underlying structure. The glass transition temperature of the polymer is preferably between −50° C. and 0° C.

New materials have also been developed.

U.S. Pat. Nos. 8,815,408 and 9,314,996 describe composite materials comprising hollow metallic shells and a solid metal foam matrix. The metal foam composites show high strength, while maintaining a favorable strength to density ratio. The composite metal foams can be prepared by various techniques, such as powder metallurgy, and casting (including aspiration casting).

Deep Springs Technology describes applications for lightweight syntactic armor materials (LSAM) materials consisting of small, hollow silicon carbide shells encapsulated in a light-weight metal matrix on its company website. The website indicates that the composites may supplement existing armor systems and increase their effectiveness by reducing system weight while increasing blast mitigation properties. The Deep Springs Technology website states that it seeks to integrate LSAMs into military vehicles that are overburdened by current armor solutions.

In contrast to the armor materials and armor systems described in the prior art, the present invention beneficially provides composite armor and armor systems incorporating substrates that reduce and/or delay compressive waves associated with ballistic impacts from reflecting off of the back surface of the armor material as tensile waves, which may damage or destroy the front face material. The armor materials, systems, and methods of the invention beneficially exhibit increased mass efficiency and reduce blunt force trauma resulting from ballistic impacts.

SUMMARY OF THE INVENTION

The invention described herein, including the various aspects and/or embodiments thereof, meets the unmet needs of the art, as well as others, by providing composite armor materials incorporating substrates that reduce and/or delay compressive waves associated with ballistic impacts from reflecting off of the back surface of the armor material as tensile waves, which may prematurely damage or destroy the front face ceramic material. Systems incorporating the composite armor materials are also provided. Further, methods for forming armor materials and armor systems incorporating the armor materials are provided. The composite armor materials, systems, and methods of the invention beneficially exhibit increased mass efficiency and reduce blunt force trauma resulting from ballistic impacts.

A composite armor material includes a ceramic front face material, and an armor substrate, backing material, or both. If the armor substrate is to be used with a ceramic front face, the substrate should have properties to enable an impedance close to or greater than the front face ceramic. Through impedance matching, the dwell time during which the ceramic remains under compression can be increased, enabling the ceramic to perform additional work against the incident projectile. The substrate impedance shall be greater than −50% of the impedance of the front strike face material. (Impedance is defined as the density multiplied by the shock velocity of the material.)

The armor front surface material is a ceramic with a syntactic substrate placed directly behind the ceramic, and backed by a high tensile-strength textile fiber material (commonly referred to as backing material). The front armor surface material can be any armor grade ceramic material constructed of varied geometries. The armor substrate can be a syntactic material of varied dimensions and material chemistry. The armor substrate can incorporate hollow spheres of varied sizes, wall thicknesses, and chemistry. The substrate is preferably aluminum encapsulating hollow ceramic spheres, formed from ceramics including silicon carbide and aluminum oxide. The diameter of the hollow ceramic spheres may be varied based on tenability to meet threat defeat requirements. The choice of parameters for the syntactic substrate can be varied in order to optimize performance and reduce areal density.

The impedance of the ceramic panel preferably ranges from 0 to 65% greater than the substrate impedance. In some aspects, the armor surface material has an impedance that is the same as the impedance of the armor substrate material. In some aspects, the armor surface material has an acoustic impedance that ranges from 0% to 65% greater than the acoustic impedance of the armor substrate material. In other aspects, the armor surface material has an impedance that is not more than 50% greater than the impedance of the armor substrate material. In additional aspects, the armor surface material may have an impedance that is not more than 25% greater than the impedance of the armor substrate material. (Acoustic impedance is defined as the density of the substrate material times the sound velocity of the material.)

According to some aspects, the armor surface material is placed in front of and in direct contact with the substrate material, such that the two materials are in contact as a result of a mechanical attachment, or direct physical contact.

A method for forming the composite armor material includes providing an armor surface material; providing a syntactic substrate adjacent to the armor surface material; attaching the armor substrate to the armor surface material; affixing a backing layer to the armor substrate; and optionally encasing the armor material and attached substrate with a protective outer layer. The armor substrate preferably has an impedance that should not be less than 35% of the impedance of the armor surface material, and can be increased to over 100% of the impedance of the armor surface material.

Other features and advantages of the present invention will become apparent to those skilled in the art upon examination of the following or upon learning by practice of the invention.

DETAILED DESCRIPTION OF EMBODIMENTS OF THE INVENTION

Figure 1:
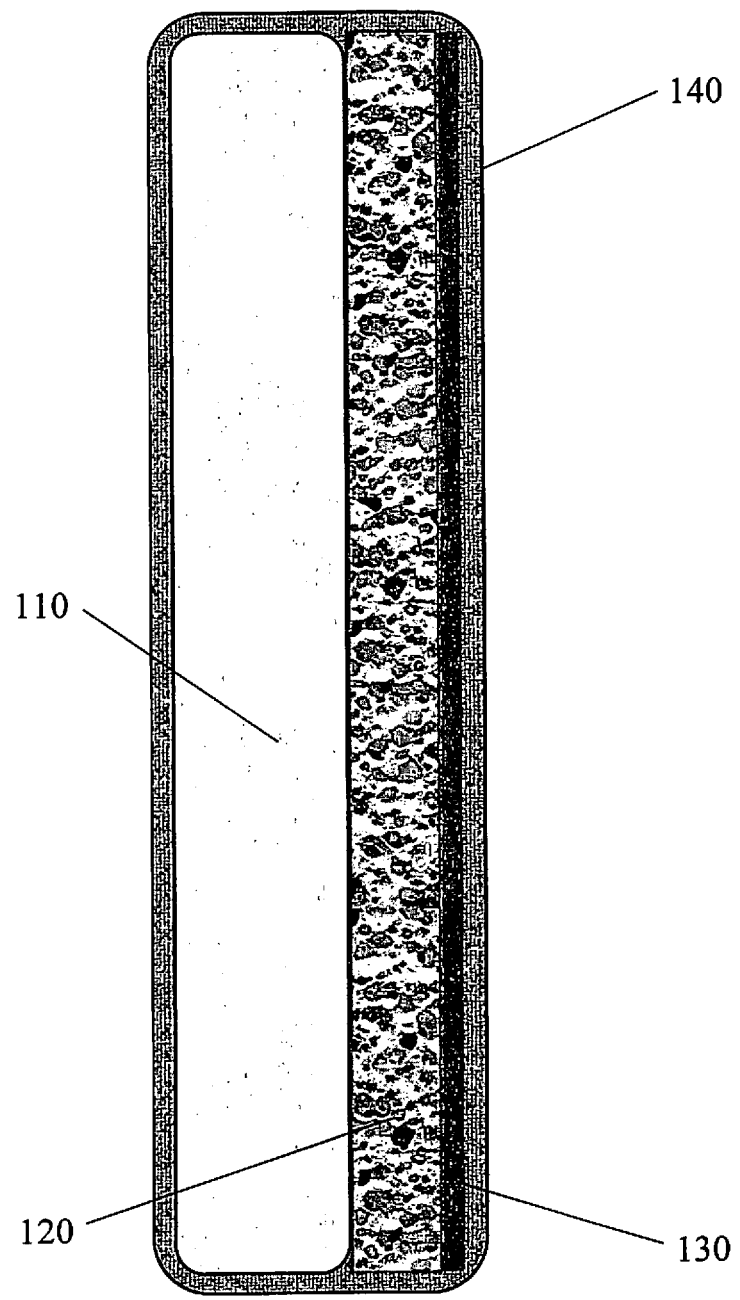
FIG. 1 illustrates a composite armor panel in accordance with an embodiment of the invention in which an armor surface material, armor substrate, and backing material are provided, and held in contact with one another using an outer wrap.

The invention described herein, including the various aspects and/or embodiments thereof, meets the unmet needs of the art, as well as others, by providing composite armor materials incorporating substrates that prevent compressive waves associated with impacts from reflecting off of the back surface of the armor material as tensile waves, which may damage or destroy the armor material. Systems incorporating the composite armor materials are also provided. Further, methods for forming armor materials and armor systems incorporating the armor materials are provided. The composite armor materials, systems, and methods of the invention beneficially exhibit increased mass efficiency and reduce blunt force trauma resulting from ballistic impacts.

The invention described herein places a syntactic substrate behind an armor surface material, and may reduce the thickness of (or entirely eliminates) the backing layer that is conventionally used in body armor.

With regarding to directions and indications of relative position used in this application, the impact or strike face of the armor material may also be referred to as the top surface, front surface, or outer surface. The armor substrate material may be referred to as being provided under, behind, or inside the armor surface material, and it is understood that this layer is oriented behind the armor surface. The front of the armor substrate is adjacent to (and may be in direct contact with) the back of the armor surface material, where the back refers to the non-impact or non-strike-face side of the armor material. A layer of backing material is provided on the surface of the armor substrate material that is not in contact with the armor material, such that the armor substrate separates the armor material from the backing layer. The backing layer is the layer oriented closest to the personnel, equipment, or vehicle being protected by the composite armor.

Dwell time is the length of time that the armor surface remains intact prior to fracture after the projectile impacts its front surface. During this time, the projectile can flatten or break up upon impact with the armor surface. Although armor materials such as ceramics exhibit high compressive strength, they suffer from low tensile strength. After the initial compressive shock wave caused by the impact of the projectile on the surface of the armor material travels through the armor material to its back surface, it is reflected as a result of the change in impedance from the armor material to the substance behind it. The compressive shock wave is reflected back through the armor material toward the front/impact surface as a tensile wave, and can combine with other tensile waves, forming spall and often exceeding the tensile strength of the armor surface material. The placement of a substrate material having a shock impedance similar to that of the armor material enables the shock wave generated by an impact to travel through the armor material and into the substrate, resulting in an increased dwell time that further degrades the projectile. In addition, the non-homogenous nature of a syntactic substrate enables dissipation of the compressive shock wave as it travels through the substrate. The increased dwell time, in turn, enables the armor material to remain as a solid for a longer period of time and resist penetration by multiple projectiles, as compared to an armor panel that does not have an impedance-matched substrate.

Testing of composite armor materials formed in accordance with the invention has demonstrated that they provide improved resistance to ballistic penetration as compared to Rolled Homogenous Armor (RHA) at much lower areal densities. Additional improvements that may be realized by using the impedance-matched armor substrates of the invention in conjunction with armor materials, including, but not limited to, reduced backface deformation and increased mass efficiency. In some aspects, the composite armor of the invention provides a mass efficiency that is at least about 3 when compared to Rolled Homogenous Armor (RHA), preferably at least about 3.25 when compared to RHA, more preferably at least about 3.5 when compared to RHA, most preferably at least about 3.75 when compared to RHA. Preferably the mass efficiency may be determined using comparative testing of the composite armor and RHA using the Department of Defense Test Method Standard "$V_{50}$ Ballistic Test for Armor" as specified in MIL-STD-662F, though other comparative tests may be employed in accordance with the invention.

One significant advantage that the invention achieves over existing armor systems is that through placement of the armor substrate, the ballistic penetration resistance performance of the composite armor can be increased. The increased dwell time enables an increased mass efficiency of at least 10%, preferably at least 15%, and more preferably at least 20% as compared to the same armor material not incorporating the armor substrate. Through the increased dwell time, the armor composition remains solid for a longer period of time than armor compositions not provided with an impedance-matched substrate, and exhibits reduced backface deformation. Additionally, the backing layer may be reduced in thickness (or in some embodiments, eliminated altogether), reducing the overall cost of the composite armor.

Various aspects of the invention will now be described with respect to the Figures.

FIG. 1 shows a composite armor material 100 in accordance with a first embodiment of the invention, in which a ceramic armor layer 110 is provided in direct contact with a layer of syntactic material 120, which includes a backing layer 130. The three layers are held together by an outer wrapping layer formed using ballistic fabric 140.

Figure 2:
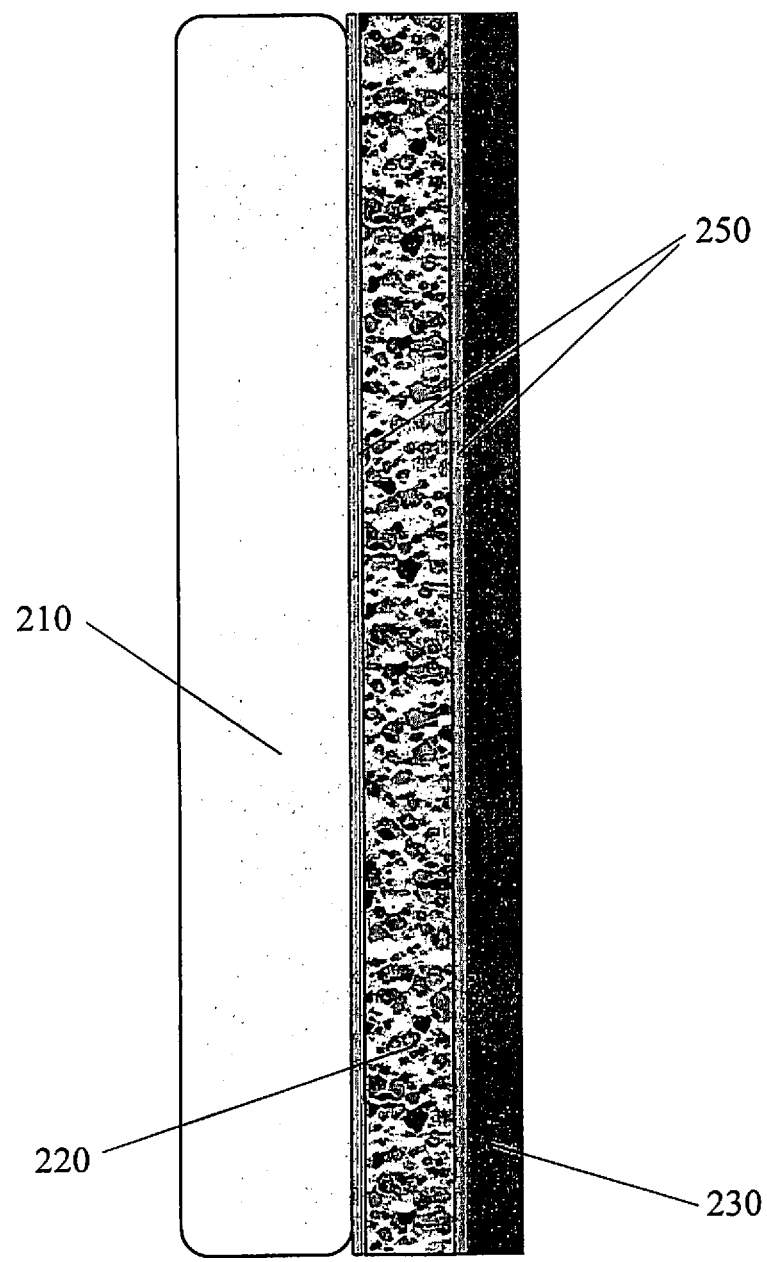
FIG. 2 is a drawing showing a composite armor panel in accordance with an embodiment of the invention in which an armor surface material, armor substrate, and backing material are provided, and held in contact with one another using adhesive.

FIG. 2 shows a composite armor material 200 in accordance with another embodiment of the invention, in which a ceramic layer 210 is adhered to a layer of substrate material 220, and the layer of substrate material is adhered to a backing layer 230. The use of adhesive layer 250 behind the armor surface material and substrate is preferably avoided, but if necessary the adhesive layer should not exceed about 0.625 mm in thickness. An adhesive layer 250 may preferably be provided between the substrate and the backing material. In addition, a wrapping of high tensile strength materials around the entire armor system may be provided in addition to the adhesive layer or layers (not shown).

Figure 3:
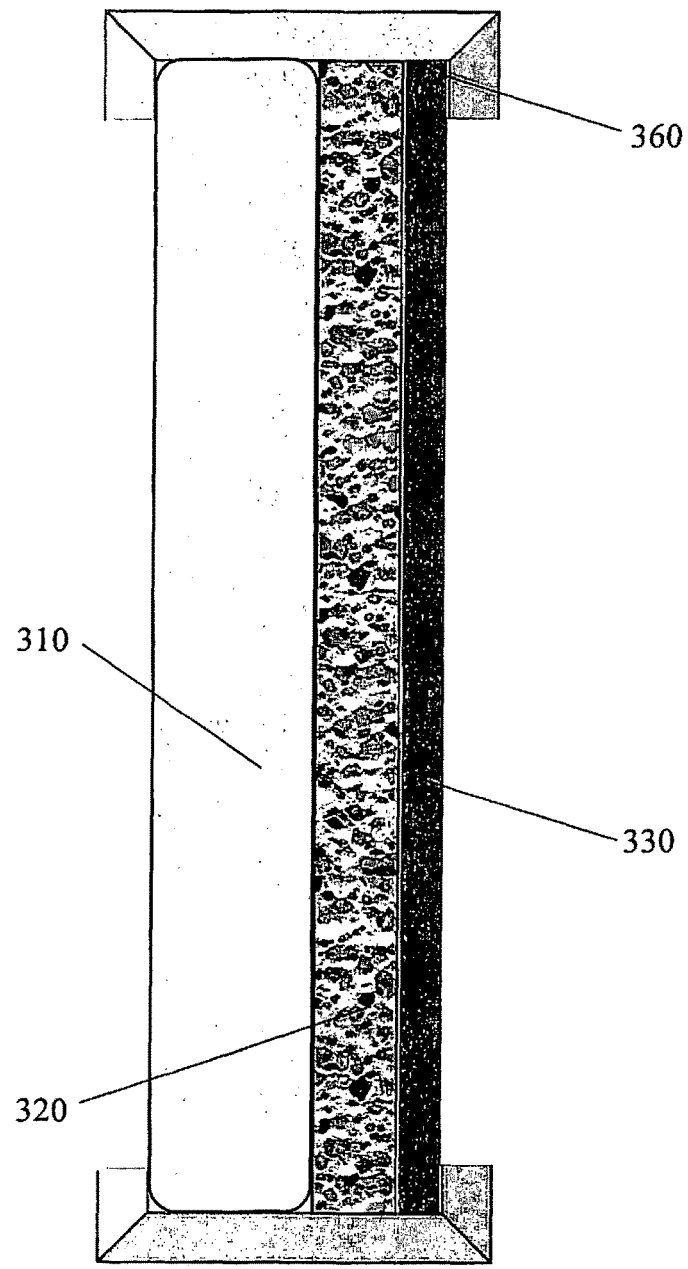
FIG. 3 is a drawing showing a composite armor panel in accordance with an embodiment of the invention in which an armor surface material and an armor substrate are provided, and are held in contact with one another using a mechanical fastening apparatus.

FIG. 3 is a composite armor material 300 in accordance with an embodiment of the invention in which mechanical fasteners 360 are used to maintain contact between a ceramic armor layer 310, armor substrate 320, and backing material 330. The mechanical fasteners, when used, may be provided at corners of the materials, along edges of the materials, or around the entire perimeter of the materials, as desired. The mechanical fasteners may be used in conjunction with adhesives and/or outer wrapping layers.

Figure 4:
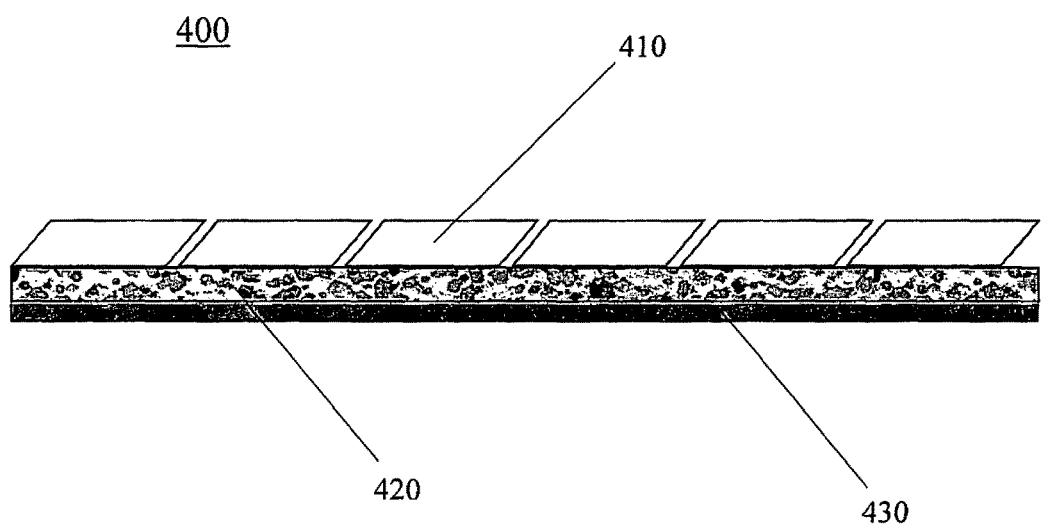
FIG. 4 is a drawing showing a composite armor configuration in which multiple armor surface material panels are affixed to an armor substrate in a manner to avoid gaps between armor surface material and substrate.

FIG. 4 is a side-view of a composite armor material 400 in which multiple panels of armor 410 are provided on a substrate layer 420, and are configured so that no gaps in coverage occur between the panels. This embodiment may be used to provide coverage over large surfaces that cannot practically be covered using a single panel of armor, and/or the substrate material may be provided in a shape (such as a curved surface having one or more radii of curvature, or an angled surface) that is difficult to form using a single panel of the armor material. A backing material 430 is provided behind substrate layer 420.

Additional aspects of the composite armor materials of the invention are described below.

In determining the effectiveness of the composite armor materials and systems of the invention, and comparing them to existing systems, the Department of Defense Test Method Standard "$V_{50}$ Ballistic Test for Armor" as specified in MIL-STD-662F, and/or the ratings of bullet resistant materials and test methods specified by the National Institute of Justice (NIJ) in Standard 0108.01 may be used. $V_{50}$ testing determines the velocity at which the probability that a specific ballistic threat will penetrate an armor material is 50%. The NIJ Standard recognizes five types of ballistic resistant protective materials, based on ability to resist a specific number of impacts from a specific ammunition fired under specific conditions. The composite armor system preferably incorporates the syntactic substrate and designs the syntactic substrate by varying the substrate thickness and hollow sphere diameter to optimize the mass efficiency of the armor system. Preferably, the armor meets or exceeds the requirements for Armor Type IV set forth in NIJ Standard 0101.04 and/or 0108.01, although alternative specifications may be used depending on the requirements of the particular armor application. It should be recognized that additional standards exist, including those established by NIJ for police body armor (NIJ Standard 0101.02) and ballistic helmets (NIJ Standard 0106.01), the U.S. State Department, ASTM, and UL. Table 1 sets forth the performance requirements for NIJ level III and IV armor.

Armor Layer

An armor layer is provided as the impact-facing surface of the composite armor material of the invention. The armor layer is formed from a high compressive strength ceramic. Representative ceramics include boron carbide (sintered, p=2.51; $Z=35.4\times10^5$ g/cm$^2\cdot$s), aluminum oxide (sintered, p=3.98; $Z=43.0\times10^5$ g/cm$^2\cdot$s), silicon carbide (sintered, p=3.16; $Z=37.5\times10^5$ g/cm$^2\cdot$s), titanium diboride (sintered, p=4.5; $Z=51.3\times10^5$ g/cm$^2\cdot$s), silicon nitride (sintered, p=3.05; $Z=33.5\times10^5$ g/cm$^2\cdot$s), aluminum nitride (hot pressed, p=3.26; $Z=35.0\times10^5$ g/cm$^2\cdot$s), and boron carbide (sintered, p=2.52; $Z=35.1\times10^5$ g/cm$^2\cdot$s). The armor layer in accordance with the invention may incorporate any of these materials to achieve the desired level of protection from impacts.

The armor layer may be configured to have any shape or thickness, depending on the particular armor application (i.e., whether applied to a particular body part as personnel protective equipment, a surface of a vehicle, or a piece of equipment). The armor layer may be provided as a solid, continuous layer, or may be in the form of multiple smaller segments of armor material assembled together, depending on the particular armor application. When smaller pieces of armor material are used together, it is preferable that the edges of the armor material overlap or are adjacent to one another so that the gaps in protection are avoided. An example of an overlapping structure is shown in FIG. 4, in which armor components 410 have edge structures configured such that no portion of the underlying substrate layer material 420 is exposed as a potential target. An optional system of mechanical attachment points (not shown) may be provided on the substrate layer material 420 in order to affix the multiple armor components, or an adhesive (not shown) may be used between the armor components 410 and the

TABLE 1

| Armor Type | Test Ammunition | Nominal Bullet Mass | Suggested Barrel Length | Required Bullet Velocity | Required Hits Per Armor Specimen | Permitted Penetrations |
|---|---|---|---|---|---|---|
| III | 7.62 mm 308 Winchester FMJ | 9.7 g 150 gr | 56 cm 22 in | 838-15 m/s 2750-50 ft/s | 5 | 0 |
| IV | 30-06 AP | 10.8 g 166 gr | 56 cm 22 in | 868-15 m/s 2850-50 ft/s | 1 | 0 |

AP = Armor Piercing
FMJ = Full Metal Jacket

Table 2 sets forth the performance requirements for level III and IV armor under NIJ Standard 0101.04.

substrate layer 420. A backing layer 430 is also provided behind the substrate layer 420.

TABLE 2

| Armor Type | Test Bullet | Bullet Weight | Reference Velocity (±30 ft/s) | Hits Per Armor Part at 0° Angle of Incidence | Total Shots Required | BFS Depth Maximum |
|---|---|---|---|---|---|---|
| III | 7.62 mm NATO FMJ | 9.6 g 148 gr | 838-15 m/s 2750-50 ft/s | 6 | 12 | 44 mm (1.73 in) |
| IV | .30 caliber M2 AP | 10.8 g 166 gr | 869 m/s (2880 ft/s) | 1 | 2 | 44 mm (1.73 in) |

AP = Armor Piercing
FMJ = Full Metal Jacket

The level of protection afforded by the armor layer may be assessed independently, or in combination with the other elements of the composite armor materials and systems of the invention. In some aspects, the level of protection may be tailored to prevent more than a designated maximum amount of blunt force trauma to an individual, vehicle, or item of equipment being protected by the armor. For example, with respect to body armor, NIJ Standard 0101.04 may be used.

Substrate Layer

An armor substrate is provided in accordance with the invention. The armor substrate is preferably impedance matched with the armor material, and is provided as a layer that is in direct contact with the back side of the armor layer, either through direct physical contact by means of mechanical compression, or through the use of an adhesive layer. Preferred armor substrates in accordance with some embodiments of the invention are syntactic armor substrates.

It should be noted that direct surface-to-surface contact between the armor layer and the armor substrate layer is preferred in order to achieve the full effect of impedance matching of the armor layer and the substrate layer. If a gap is present between the armor layer and substrate layer that results in a mismatch in impedance as a shock wave passes through the armor layer and into the substrate layer, then the full benefits of the composite armor materials and systems of the invention may not be achieved, because tensile waves may reflect from the back surface of the armor layer that damage or destroy the armor layer. If an adhesive material is used to join the armor material with the armor substrate, it preferably does not exceed a thickness of 0.625 mm.

The composition of the armor substrate may vary, but preferably a material having a lower density than common ballistic armor materials is selected in order to achieve weight reduction in the overall armor system. For example, solid aluminum has a high shock velocity (i.e., about 6500 m/s), but a lower density than ballistic armor materials (i.e., about 2.7 g/cm$^3$). Metals and alloys having a low density are preferred for use as substrates in accordance with the invention, and may be selected from aluminum, magnesium, titanium, beryllium, and their alloys. In some aspects of the invention, the aluminum alloy designated 6061 is preferred. The alloy composition of 6061 may include: silicon (minimum 0.4%, maximum 0.8% by weight); iron (no minimum, maximum 0.7%); copper (minimum 0.15%, maximum 0.4%); manganese (no minimum, maximum 0.15%); magnesium (minimum 0.8%, maximum 1.2%); chromium (minimum 0.04%, maximum 0.35%); zinc (no minimum, maximum 0.25%); titanium (no minimum, maximum 0.15%); and other elements (no more than 0.05% each, no more than 0.15% total). The remainder of the composition of 6061 is aluminum (95.85%-98.56%).

As noted above, the armor substrate should have a shock impedance that is close to that of the armor surface material. In order to achieve a matching shock impedance, the material that comprises the armor substrate may include internal voids formed therein, for example, by including hollow spheres (thereby forming a syntactic material), solid spheres of materials having a lower density than the light metal or light metal alloy, or internal air cavities. In accordance with some aspects, the armor substrate material is a syntactic foam. When using the term sphere to describe the materials that may be used to form internal voids, it is to be understood that the term is not limited to perfect spheres, but may encompass any shape that is generally round or ball-like, even if not perfectly spherical. By utilizing an armor substrate having hollow spheres or cavities therein, dispersion of the shock wave resulting from an impact may be improved, while simultaneously reducing the mass of the substrate.

Separation between spheres, when provided, can be from zero (touching) to a maximum distance equal to the average radius of the spheres being used, with the value within this range selected based on substrate material minimum strength requirements, target impedance value for the substrate material, and weight/density goals. The advantages of using discrete particles include: (i) the spherical shape of the particles induces obliquity in the path of a projectile; (ii) the particles provide spatial dispersion of the pressure waves; (iii) the particles provide a reduction in the areal density of the layer compared to a solid substrate layer; and (iv) the particles can cause fracture or abrasion of the projectile by impact on the particles (even upon fracture of the particles themselves, since encapsulation by the surrounding substrate maintains the comminuted material in the path of the incoming projectile).

In one preferred embodiment, the substrate is formed by encapsulating silicon carbide hollow spheres of about 1 mm in diameter within an aluminum layer by blending the spheres into molten aluminum to form a syntactic aluminum sheet that is from about 0.1" to about 0.25" thick. In another preferred embodiment, the substrate layer is an aluminum foam formed by introducing air bubbles into molten aluminum as it cools. According to one presently-preferred embodiment, the substrate layer may be formed using aluminum tiles having hollow silicon carbide spheres embedded in a light-weight aluminum metal matrix, such as the Light-weight Syntactic Armor Material (LSAM) available from Deep Springs Technology, of Toledo, Ohio.

Alternative sphere compositions may be used in accordance with the invention, including the use of ceramic materials used in armor materials (i.e., boron carbide, silicon carbide, aluminum oxide, titanium diboride, silicon nitride, aluminum nitride, and tungsten carbide) to form hollow or solid spheres, and the use of glass or plastic/resin (i.e., polycarbonate, polyethylene, and/or acrylic) as hollow or solid spheres. In some aspects of the invention, lower-cost aluminum oxide hollow ceramic spheres are used in place of silicon carbide spheres. When provided, the spheres can have a diameter of from about 0.25 mm up to the thickness of the substrate armor material, preferably from about 0.5 mm to about 2 mm, and most preferably are about 1 mm in diameter. The thickness of the substrate armor material may be from about 0.01" to about 1" (about 0.254 mm to about 25.4 mm), preferably from about 0.05" to about 0.5" (about 1.27 mm to about 12.7 mm), and more preferably from about 0.1" to about 0.25" (about 2.54 mm to about 6.35 mm). The spheres may be constructed in any manner that enables improved mass efficiency of the armor materials.

The incorporation of the hollow spheres into the substrate material results in a syntactic foam that provides benefits in addition to the enhanced mass effectiveness realized by the composite armor of the invention. For example, the presence of the hollow particles results in lower density, higher specific strength (i.e., strength divided by density), a lower coefficient of thermal expansion, and in some cases, radar or sonar transparency.

Impedance is defined as the product of a material's density and the velocity at which shock waves travel through the material, and acoustic impedance constants (Z) can be used as a reasonable approximation of impedance for purposes of comparing materials. The armor surface material may have an impedance that is the same as the impedance of the armor substrate material. The armor surface material may have an impedance that is greater than the impedance of the armor substrate material, preferably ranging from 0% to 65% greater than the impedance of the substrate. In some aspects, the armor surface material has an impedance that is not more than 50% greater than the impedance of the armor substrate material. In additional aspects, the armor surface material has an impedance that is not more than 25% greater than the impedance of the armor substrate material. In other aspects, the armor substrate material has an impedance that is at least 35% of the impedance of the armor surface material, preferably at least 50%, more preferably at least 65%, most preferably at least 80%. In some aspects, the impedance of the armor substrate material is the same as the impedance of the armor surface material, and can be increased to over 100% of the impedance of the armor surface material.

According to some aspects, the armor surface material is placed in front of the armor substrate material, and is in direct contact with the armor substrate material, such that the two materials are in contact as a result of a mechanical attachment, or direct physical contact. The direct contact may be maintained through use of fasteners provided along the edges of the armor material or at the corners of the armor material, or both. The mechanical fasteners preferably provide a smooth interface between the armor surface material and armor substrate layer. The direct contact may also be maintained through use of an outer covering or overwrap provided around the panel of armor material and substrate material. The outer covering or overwrap may be formed using materials currently used on armor panels, such as Kevlar® fabric, UHMWPE fabric, or nylon fabric.

An adhesive layer may optionally be provided to bond the armor layer and substrate layers together. Preferably, the thickness of the adhesive layer is kept to the minimum thickness required to effectively bond the armor surface material and the armor substance material. In some aspects, the thickness of the adhesive layer is less than 0.625 mm (0.025 inches). The adhesive layer may have a thickness less than 20 mils (0.508 mm or 0.020 inches), preferably less than 10 mils (0.254 mm or 0.010 inches), and more preferably as thin as 5 mils (0.127 mm or 0.005 inches) in thickness. When provided, the adhesive may be a very thin layer of polymer. Polyureas are preferred polymers in accordance with some aspects of the invention.

Even if an adhesive is used to maintain contact between the armor material and the substrate material, an overwrap or outer covering may be provided to maintain the contact between them, and to protect their surfaces from damage.

The level of protection afforded by the armor substrate layer alone may be assessed independently, but preferably it is assessed in combination with the other elements of the composite armor materials and systems of the invention in order to determine the increased performance of the composite armor materials and systems as compared to armor materials and systems not incorporating the substrate. In some aspects, the level of protection may be tailored to achieve a designated maximum amount of blunt force trauma to an individual, vehicle, or item of equipment being protected by the armor.

Backing Layer

The substrate layer will have a backing layer applied to the rear surface that is not in contact with the armor layer.

Each of the armor systems will include a backing material or spall liner on the inner side of the armor substrate for protecting personnel and equipment from spalling of the hard armor components in the event that an impact results in shattering of the armor materials. An example of a suitable spall liner is a layer of an ultra-high-molecular-weight polyethylene (UHMWPE) gel-spun fiber material sold commercially under the trade name HB50 Dyneema® made by DSM, headquartered in Heerlen, Netherlands, although other materials are also suitable for use as a spall liner, including, but not limited to, additional Dyneema materials, as well as the Centurion™ composite fabric and Spectra Shield® composite materials made by Honeywell, headquartered in Morris Plains, N.J. Additional backing materials that may be incorporated into the armor materials and armor systems of the invention include high tensile strength textile fibers capable of arresting residual projectile materials, and target spall materials. Such textile materials can include UHMWPE, aromatic fibers (e.g., Kevlar), and any other material capable of arresting residual particles from the back side of the target.

The backing layer may be from about 0.05" to about 1.0" thick (about 1.27 mm to about 25.4 mm). Typically for small arms, the backing layer is from about 0.1" to about 0.3" thick (about 2.54 mm to about 7.62 mm), but for higher-level threats the thickness can be increased to about 1 inch (about 25.4 mm) or greater. In some aspects of the invention, the backing layer is provided to contain any fragments that may be generated as a result of a ballistic impact on the composite armor material.

Method of Manufacture

Composite armor in accordance with the invention may be formed by using existing techniques for assembling body armor or vehicle armor, including gluing, mechanically fastening, compressing, and wrapping the surface armor and armor substrate materials (and optionally any backing layer) so that they are provided in direct contact with one another.

When used as personnel protective equipment, the composite armor is preferably configured to be compatible in size and weight with existing systems for accepting armor inserts, such as vests having pockets for holding plate armor in positions that protect vital organs, the spine, and other key anatomical landmarks on the human or service animal being protected. When used as vehicle armor or to protect other equipment, the composite armor may be provided in custom shapes and sizes consistent with the areas to be protected.

The composite armor may be provided as substantially flat panels, or as panels that have a curvature designed to conform to a body, vehicle, or equipment surface. The panels may have a convex or concave curvature, depending on the shape and configuration of the area being protected. Due to the ductile nature of the substrate material, and flexibility of the optional backing materials, the composite armor can also be formed into a variety of shapes incorporating angles and other complex features. If a particular shape cannot be imparted to the outer armor material layer without compromising its ability to protect against impacts, then multiple substantially flat panels of the armor material may be applied to the shaped or formed substrate material.

Example

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

The ballistic limit (i.e., penetration limit) is the velocity required for a projectile to reliably penetrate a particular piece of armor. The $V_{50}$ ballistic limit is the velocity at which the projectile is expected to penetrate the armor 50% of the time.

In this example, the $V_{50}$ is determined as the average of the lowest velocity for complete penetration, and the highest velocity for partial penetration, with the testing carried out until these quantities differ by no more than 15 m/s. The projectile velocity is determined using two pairs of tandem chronographs, and allowing the velocity to be measured at the same position. The parameters for this testing are set forth in the Department of Defense Test Method Standard "$V_{50}$ Ballistic Test for Armor" as specified in MIL-STD-662F.

Table 3 provides test results comparing the mass efficiency of Rolled Homogeneous Armor (armor made of a single steel composition that is rolled to form plates having a homogenous grain structure) to various composite armor materials formed in accordance with the invention, which included an outer ceramic armor layer (boron carbide or silicon carbide), an aluminum substrate layer incorporating silicon carbide hollow spheres (including small hollow spheres having a diameter of 1 mm, large hollow spheres having a diameter of up to 5 mm, or small short hollow spheres having a diameter of 1 mm), and an ultra-high-molecular-weight polyethylene layer. All the tests were performed with .30 caliber M2 armor piercing projectiles at 200 fps above muzzle velocity.

TABLE 3

| Target | Proj/vel | Ceramic tile | Mass | Density | Al tile with SiC hollow spheres | Mass | Density | HB50 | Areal Density | RHA AD | Mass Eff (RHA) |
|---|---|---|---|---|---|---|---|---|---|---|---|
| SiC/Al-SiC small hollow sphere | 30 cal M2AP 2997 fps | 3.94" × 3.94" × .32" | 255.6 g | 3.134 g/cm³ 5.215 psf | 4.02" × 4.02" × 0.263" | 119.3 g | 1.713 g/cm³ 2.34 psf | 0.035 psf | 7.59 psf | 26.52 psf | 3.49 |
| SiC/Al-SiC small hollow sphere | 30 cal M2AP 2934 fps | 3.94" × 3.94" × .32" | 255.6 g | 3.134 g/cm³ 5.215 psf | 4.02" × 4.02" × 0.263" | 119.3 g | 1.713 g/cm³ 2.34 psf | 0.302 psf | 7.857 psf | 26.52 psf | 3.375 |
| SiC/Al-SiC small hollow sphere | 30 cal M2AP 2963 fps | 3.94" × 3.94" × .32" | 255.6 g | 3.134 g/cm³ 5.215 psf | 4.02" × 4.02" × 0.263" | 119.3 g | 1.713 g/cm³ 2.34 psf | 0.189 psf | 7.744 psf | 26.52 psf | 3.426 |
| B₄C/Al-SiC large hollow sphere | 30 cal M2AP 2939 fps | 4.058" × 4.10" × 3.15" | 210.5 g | 2.45 g/cm³ 4.04 psf | 4.655" × 3.845" × 0.296" | 139.3 g | 1.60 g/cm³ 2.46 psf | 0.529 psf | 7.029 psf | 26.52 psf | 3.77 |
| B₄C/Al-SiC large hollow sphere | 30 cal M2AP 2963 fps | 4.12" × 4.09" × 3.2" | 218.5 g | 2.45 g/cm³ 4.04 psf | 4.655" × 3.845" × 0.296" | 139.3 g | 1.60 g/cm³ 2.46 psf | 1.22 psf | 7.75 psf | 26.52 psf | 3.43 |
| B₄C/Al-SiC large hollow sphere | 30 cal M2AP 2963 fps | 4.12" × 4.09" × 3.2" | 218.5 g | 2.45 g/cm³ 4.04 psf | 4.02" × 4.03" × 0.265" | 119.4 g | 1.713 g/cm³ 2.34 psf | 0.587 psf | 6.967 psf | 26.52 psf | 3.81 |
| B₄C/Al-SiC large hollow sphere | 30 cal M2AP 2963 fps | 4.11" × 4.085" × 3.2" | 218.5 g | 2.45 g/cm³ 4.04 psf | 4.02" × 4.03" × 0.265" | 118.1 g | 1.713 g/cm³ 2.34 psf | 1.63 psf | 8.01 psf | 26.52 psf | 3.32 |
| SiC/Al-SiC large hollow sphere | 30 cal M2AP 2901 fps | 3.94" × 3.94" × .32" | 255.6 g | 3.134 g/cm³ 5.215 psf | 4.655" × 3.845" × 0.296" | 139.3 g | 1.60 g/cm³ 2.46 psf | 0.095 psf | 7.62 psf | 26.52 psf | 3.48 |
| SiC/Al-SiC large hollow sphere | 30 cal M2AP 2920 fps | 3.94" × 3.94" × .32" | 255.6 g | 3.134 g/cm³ 5.215 psf | 4.655" × 3.845" × 0.296" | 139.3 g | 1.60 g/cm³ 2.46 psf | 0.18 psf | 7.86 psf | 26.52 psf | 3.37 |
| SiC/Al-SiC small hollow sphere | 30 cal M2AP 2925 fps | 3.0" × 3.0" × .25" | 116.5 g | 3.16 g/cm³ 4.104 psf | 4.02" × 4.03" × 0.265" | 119.4 g | 1.713 g/cm³ 2.34 psf | 1.75 psf | 8.19 psf | 26.52 psf | 3.23 |
| SiC/Al-SiC small hollow sphere | 30 cal M2AP 2937 fps | 3.0" × 3.0" × .25" | 116.5 g | 3.16 g/cm³ 4.104 psf | 4.02" × 4.03" × 0.265" | 119.4 g | 1.713 g/cm³ 2.34 psf | 2.37 psf | 8.81 psf | 26.52 psf | 3.01 |
| SiC/Al-SiC large hollow sphere | 30 cal M2AP 2919 fps | 3.0" × 3.0" × .25" | 116.5 g | 3.16 g/cm³ 4.104 psf | 4.655" × 3.845" × 0.296" | 139.3 g | 1.60 g/cm³ 2.46 psf | 1.28 psf | 7.84 psf | 26.52 psf | 3.38 |
| SiC/Al-SiC large hollow sphere | 30 cal M2AP 2917 fps | 3.0" × 3.0" × .25" | 116.5 g | 3.16 g/cm³ 4.104 psf | 4.655" × 3.845" × 0.296" | 139.3 g | 1.60 g/cm³ 2.46 psf | 1.03 psf | 7.59 psf | 26.52 psf | 3.49 |
| SiC/Al-SiC small hollow sphere | 30 cal M2AP 2925 fps | 3.0" × 3.0" × .25" | 116.5 g | 3.16 g/cm³ 4.104 psf | 3.0" × 2.984" × 0.098" | 26.7 g | 1.85 g/cm³ 0.943 psf | 1.79 psf | 6.83 psf | 26.52 psf | 3.88 |
| SiC/Al-SiC small hollow sphere | 30 cal M2AP 2963 fps | 3.0" × 3.0" × .25" | 116.5 g | 3.16 g/cm³ 4.104 psf | 3.0" × 2.984" × 0.098" | 26.7 g | 1.85 g/cm³ 0.943 psf | 1.98 psf | 7.02 psf | 26.52 psf | 3.77 |

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A composite armor material, comprising:
   an armor surface material comprising ceramic;
   an armor syntactic substrate comprising a metal having spheres formed from materials selected from the group consisting of ceramic, glass, plastic and resin therein, wherein the armor syntactic substrate comprises a front surface that is in contact with the armor surface material, and a rear surface that is not in contact with the armor surface material; and
   a backing layer provided on the rear surface of the armor syntactic substrate,
   wherein the armor syntactic substrate has an impedance that is greater than 35% of the impedance of the armor surface material.

2. The composite armor material of claim 1, wherein the ceramic of the armor surface material is selected from the group consisting of boron carbide, aluminum oxide, silicon carbide, titanium diboride, silicon nitride, aluminum nitride, tungsten carbide, and combinations thereof.

3. The composite armor material of claim 1, wherein the armor surface material comprises a continuous layer.

4. The composite armor material of claim 1, wherein the armor syntactic substrate is in contact with the armor surface material through mechanical attachment.

5. The composite armor material of claim 4, wherein mechanical attachment between the armor surface material and armor syntactic substrate is maintained by mechanical fasteners.

6. The composite armor material of claim 4, wherein mechanical attachment between the armor surface material and armor syntactic substrate is maintained by an adhesive layer having a thickness less than 0.625 mm provided between the armor surface material and armor syntactic substrate.

7. The composite armor material of claim 1, wherein the armor syntactic substrate comprises a metal selected from the group consisting of aluminum, magnesium, titanium, beryllium, aluminum alloys, magnesium alloys, titanium alloys, beryllium alloys, and combinations thereof.

8. The composite armor material of claim 1, wherein the spheres are solid or hollow, and have a lower density than the metal.

9. The composite armor material of claim 1, wherein the ceramic spheres comprise a ceramic selected from the group consisting of boron carbide, aluminum oxide, silicon carbide, titanium diboride, silicon nitride, aluminum nitride, tungsten carbide, and combinations thereof.

10. The composite armor material of claim 1, wherein the armor syntactic substrate has an impedance that is greater than 50% of the impedance of the armor surface material.

11. The composite armor material of claim 1, wherein the armor syntactic substrate has an impedance that is about the same as the impedance of the armor surface material.

12. The composite armor material of claim 1, wherein the composite armor material achieves a $V_{50}$ ballistic limit of at least 2900 fps when impacted by a .30 caliber M2 armor piercing round.

13. The composite armor material of claim 1, wherein the backing material comprises an ultra-high-molecular-weight polyethylene.

14. A method of making a composite armor material, comprising:
   providing an armor surface material comprising ceramic;
   providing an armor syntactic substrate comprising a metal having spheres formed from materials selected from the group consisting of ceramic, glass, plastic and resin therein, wherein the armor syntactic substrate comprises a front surface that is in contact with the armor surface material, and a rear surface that is not in contact with the armor surface material;
   attaching the armor syntactic substrate to the armor surface material;
   affixing a backing layer to the armor syntactic substrate; and
   optionally encasing the armor surface material and attached armor syntactic substrate with a protective outer layer,
   wherein the armor substrate has an impedance that is greater than 35% of the impedance of the armor surface material.

15. The method of claim 14, wherein the armor syntactic substrate is attached to the armor surface material by methods selected from the group consisting of gluing, mechanically fastening, and wrapping the armor surface material and armor syntactic substrate.

16. The method of claim 14, wherein the ceramic of the armor surface material is a selected from the group consisting of boron carbide, aluminum oxide, silicon carbide, titanium diboride, silicon nitride, aluminum nitride, tungsten carbide, and combinations thereof.

17. The method of claim 14, wherein the armor syntactic substrate comprises a metal selected from the group consisting of aluminum, magnesium, titanium, beryllium, aluminum alloys, magnesium alloys, titanium alloys, beryllium alloys, and combinations thereof.

* * * * *